United States Patent
Fiterman

(10) Patent No.: US 11,542,837 B2
(45) Date of Patent: Jan. 3, 2023

(54) SYSTEM AND METHOD FOR INCREASING POWER OUTPUT FROM AN ORGANIC VAPOR TURBINE

(71) Applicant: ORMAT TECHNOLOGIES INC., Reno, NV (US)

(72) Inventor: Anton Fiterman, Moshav Shani (IL)

(73) Assignee: ORMAT TECHNOLOGIES INC., Reno, NV (US)

( * ) Notice: Subject to any disclaimer, the term of this patent is extended or adjusted under 35 U.S.C. 154(b) by 0 days.

(21) Appl. No.: 17/264,025

(22) PCT Filed: Dec. 27, 2018

(86) PCT No.: PCT/IB2018/060637
§ 371 (c)(1),
(2) Date: Jan. 28, 2021

(87) PCT Pub. No.: WO2020/026022
PCT Pub. Date: Feb. 6, 2020

(65) Prior Publication Data
US 2021/0317758 A1    Oct. 14, 2021

Related U.S. Application Data

(60) Provisional application No. 62/711,911, filed on Jul. 30, 2018.

(51) Int. Cl.
*F01K 7/18* (2006.01)
*F24T 50/00* (2018.01)
(Continued)

(52) U.S. Cl.
CPC .............. *F01K 7/18* (2013.01); *F01K 21/00* (2013.01); *F01K 25/06* (2013.01); *F01K 25/08* (2013.01);
(Continued)

(58) Field of Classification Search
CPC . F01K 7/18; F01K 25/06; F01K 25/08; F01K 21/00; F24T 50/00; F03G 4/035; F03G 4/001; F05D 2220/31
(Continued)

(56) References Cited

U.S. PATENT DOCUMENTS 4,871,295 A * 10/1989 Kaplan .................. F01D 17/18
415/94
5,531,073 A    7/1996 Bronicki et al.
(Continued)

FOREIGN PATENT DOCUMENTS

FR         1521082 A       4/1968
WO    2017072644 A1       5/2017
WO    2017195094 A1      11/2017

OTHER PUBLICATIONS

International Search Report issued in Application No. PCT/IB2018/060637 dated Jul. 15, 2019, 3 pages.
(Continued)

*Primary Examiner* — Hoang M Nguyen
(74) *Attorney, Agent, or Firm* — Cantor Colburn LLP

(57) ABSTRACT

A binary power plant system, comprising: a vaporizer for vaporizing an organic motive fluid circulating in a closed Organic Rankine Cycle (ORC) by a heat source fluid in heat exchange relation therewith and producing wet organic motive fluid vapor having a quality of at least approximately 80 percent; and a single organic vapor, turbine of said ORC: having an inlet for receiving the wet organic motive fluid vapor, wherein organic motive fluid vapor is expanded in said single organic vapor turbine without causing turbine blades of the turbine to be subjected to erosion.

18 Claims, 8 Drawing Sheets

(51) Int. Cl.
*F03G 4/00* (2006.01)
*F01K 21/00* (2006.01)
*F01K 25/06* (2006.01)
*F01K 25/08* (2006.01)

(52) U.S. Cl.
CPC ............ *F03G 4/001* (2021.08); *F03G 4/035* (2021.08); *F24T 50/00* (2018.05); *F05D 2220/31* (2013.01)

(58) Field of Classification Search
USPC .............................. 60/641.2–641.4, 651, 671
See application file for complete search history.

(56) References Cited

U.S. PATENT DOCUMENTS

| | | | |
|---|---|---|---|
| 7,775,045 B2* | 8/2010 | Kaplan | .................. F01K 25/08 60/641.2 |
| 8,889,747 B2 | 11/2014 | Digenova et al. | |
| 2009/0188253 A1* | 7/2009 | Smith | ..................... F01C 21/04 60/657 |
| 2010/0071368 A1* | 3/2010 | Kaplan | .................. F01K 25/08 60/651 |
| 2012/0260655 A1 | 10/2012 | Kaplan et al. | |
| 2014/0096522 A1* | 4/2014 | Kirchner | .................. F01K 7/22 60/648 |
| 2015/0052895 A1* | 2/2015 | Hsu | ....................... F01K 13/003 60/645 |
| 2015/0082793 A1 | 3/2015 | Maitrejean | |
| 2016/0319703 A1 | 11/2016 | Burg et al. | |
| 2018/0080341 A1 | 3/2018 | Batscha et al. | |

OTHER PUBLICATIONS

Written Opinion issued in Application No. PCT/IB2018/060637 dated Jul. 15, 2019, 5 pages.

Extended European Search report issued in Application No. 18928744.4 dated Mar. 2, 2022, 9 pages.

* cited by examiner

SYSTEM AND METHOD FOR INCREASING POWER OUTPUT FROM AN ORGANIC VAPOR TURBINE

CROSS REFERENCE TO RELATED APPLICATIONS

This application is a US National Stage application of PCT/IB2018/060637, filed Dec. 27, 2018, which claims the benefit of U.S. Provisional Application No. 62/711,911, filed Jul. 30, 2018, both of which are incorporated by reference in their entirety herein.

FIELD

The present invention relates to the field of power plants. More particularly, the invention relates to a system and method for increasing the power-output from an organic-, vapor turbine, particularly by means of a low temperature heat resource.

BACKGROUND

Due to the dwindling worldwide energy resources, energy-professionals have been challenged to utilize relatively low temperature heat resources, such as geothermal steam and industrial waste heat, for power production.

An Organic Rankine Cycle (ORC) is well suited to exploit the energy content of a low temperature heat resource due to the relatively low boiling point of organic motive fluid. Organic fluid flowing in a closed cycle vaporizes alter extracting heat from the low temperature heat resource. The vapor is expanded in an organic vapor turbine that converts some of the heat in the vapor to work and electricity and thereby producing heat-depleted organic vapor that is condensed in a condenser. The condensed organic fluid is returned to the vaporizer, and the cycle is repeated.

The condenser rejects the remaining heat in the heat-depleted vapor into ambient air, if an air-cooled condenser is involved, or into cooling water, if a water-cooled condenser is used. Typically, the vaporizer is operated at a pressure that produces saturated or only slightly superheated vapor due to the pressures involved being relatively low and the design of the heat exchanger that constitutes the vaporizer, the piping for conveying the vapor, and the turbine. In order to maximize power output of a power plant of the type described, the temperature drop of the heat resource fluid across the vaporizer as well as the vaporization temperature in the vaporizer must be optimized.

One technique for increasing the power is to extract more heat from, the heat resource by increasing its temperature drop. However, increasing the amount of heat, extracted from the heat resource by increasing its temperature drop across the vaporizer, or airy other heat exchanger system, has the effect of decreasing efficiency of the power plant. This results in a reduction of the vaporization temperature of the operating fluid in the heat exchanger, thus reducing the Carnot efficiency of the power plant.

U.S. Pat. No. 5,631,073 discloses a Rankine cycle power plant having first and second multi-staged turbine modules, a vaporizer for supplying vaporized working fluid to the first module, a preheater for supplying heated working fluid to the vaporizer, and a mixer interposed between the first and second modules through which, superheated, heat depleted working fluid from the first module is desuperheated and transferred to the inlet of the second module. However, this power plant is dependent upon two turbine modules for increasing power output, unduly adding expenses to the power plant.

It is an object of the present invention to provide a system and method for increasing the power output from the single organic vapor turbine of a power plant.

It is an object of the present invention to provide a cost effective system and method for increasing the power output from an organic vapor turbine of a power plant.

It is an additional object of the present invention to provide a system and method for increasing the power output from an organic vapor turbine of a power plant whose motive fluid extracts heat from a low-temperature heat source.

Other objects and advantages of the invention will become apparent as the description proceeds.

SUMMARY

A binary power plant system, comprising: a vaporizer for vaporizing an organic motive fluid circulating in a closed Organic Rankine Cycle (ORC) by a heat source fluid in heat exchange relation therewith and producing wet organic motive fluid vapor having a quality of at least approximately 80 percent; and a single organic vapor turbine of said ORC having an inlet for receiving said wet organic motive fluid vapor, wherein organic motive fluid vapor is expanded m said single organic vapor turbine.

A multi-stage organic vapor turbine subjected to variable phase flow conditions, comprising: a first inlet upstream to a first stage of the organic vapor turbine, through, which wet organic motive fluid vapor is introduced from a vaporizer having a quality of at least approximately 80 percent, wherein organic motive fluid vapor is expanded in the first stage to a superheated state, a second, inlet upstream to an intermediate stage of the organic vapor turbine, through which additional organic motive fluid, is introduced from the vaporizer, an injection nozzle fitted in said second inlet for injecting the additional organic motive fluid and configured to cause the organic motive fluid flowing therethrough to undergo an evaporation process producing organic motive fluid vapor; and a mixing chamber in fluid communication with the injection nozzle and the expanded organic motive fluid vapor exiting the first stage, in which the evaporated vapor is mixed with the expanded organic motive fluid vapor to produce an organic motive fluid vapor in an equilibrium state, such that a flow rate of the organic motive fluid vapor flowing through the intermediate stage is increased whereby additional power is produced.

A method tor increasing power output from a multi-stage organic vapor turbine, comprising the steps of: introducing, via a first discharge line extending from a vaporizer, wet organic motive fluid vapor having a quality of at least approximately 80 percent into a first stage of the organic vapor turbine, to cause expansion of organic motive fluid vapor to produce a superheated organic motive fluid vapor and power; and injecting, via a second discharge line extending from the vaporizer, additional organic motive fluid through an injection nozzle, provided in a housing of the annular turbine housing, into an intermediate stage of the organic vapor turbine, to induce an evaporation process whereby liquid of the injected motive fluid is converted to vapor, and a mass flow rate of motive fluid vapor through, the intermediate stage is increased whereby additional power is produced.

This is achieved by providing said mixing chamber or interior chamber, etc., with the appropriate geometry to permit evaporation of the injected organic motive fluid between the turbine stages. Furthermore, in such a manner, the efficiency of utilization of the heat source is improved particularly at relatively low temperatures of the heat source fluid.

DETAILED DESCRIPTION

The novel binary power plant of the present invention increases the amount, of power produced or heat input into the power cycle and thus power plant profitability by supplying the organic vapor turbine with a liquid-vapor mixture of organic motive fluid, which also may be referred to as "wet organic motive fluid vapor". This power plant is well suited to generate power from a low-temperature heat source, such as low-temperature geothermal heat sources.

Traditionally, the organic motive fluid circulating in a closed ORC of a binary geothermal power plant has heretofore been preheated by heat depleted geothermal fluid discharged, from the vaporizer- and subsequently vaporized to a saturated vapor point prior to being supplied to the organic vapor turbine, in order to produce power while mitigating possible damage to the turbine blades when undergoing expansion in the turbine. This could bring about a possible reduction in the utilization of heat and power output production of the turbine.

It has now been found that the turbine blades of the single organic vapor turbine of the power plant essentially are not damaged, while improved cycle thermal efficiency is realized, as will be described hereinafter, by supplying the organic vapor turbine with wet organic motive fluid vapor having a quality, or percentage of saturated organic vapor in the saturated, liquid-vapor mixture, of about 80% or more. At this quality of the organic motive fluid, the majority of expansion takes place in the superheated vapor region. The dynamics of the turbine rotor(s) are effected only when the quality of the wet organic motive fluid is above a certain level.

Figure 1:
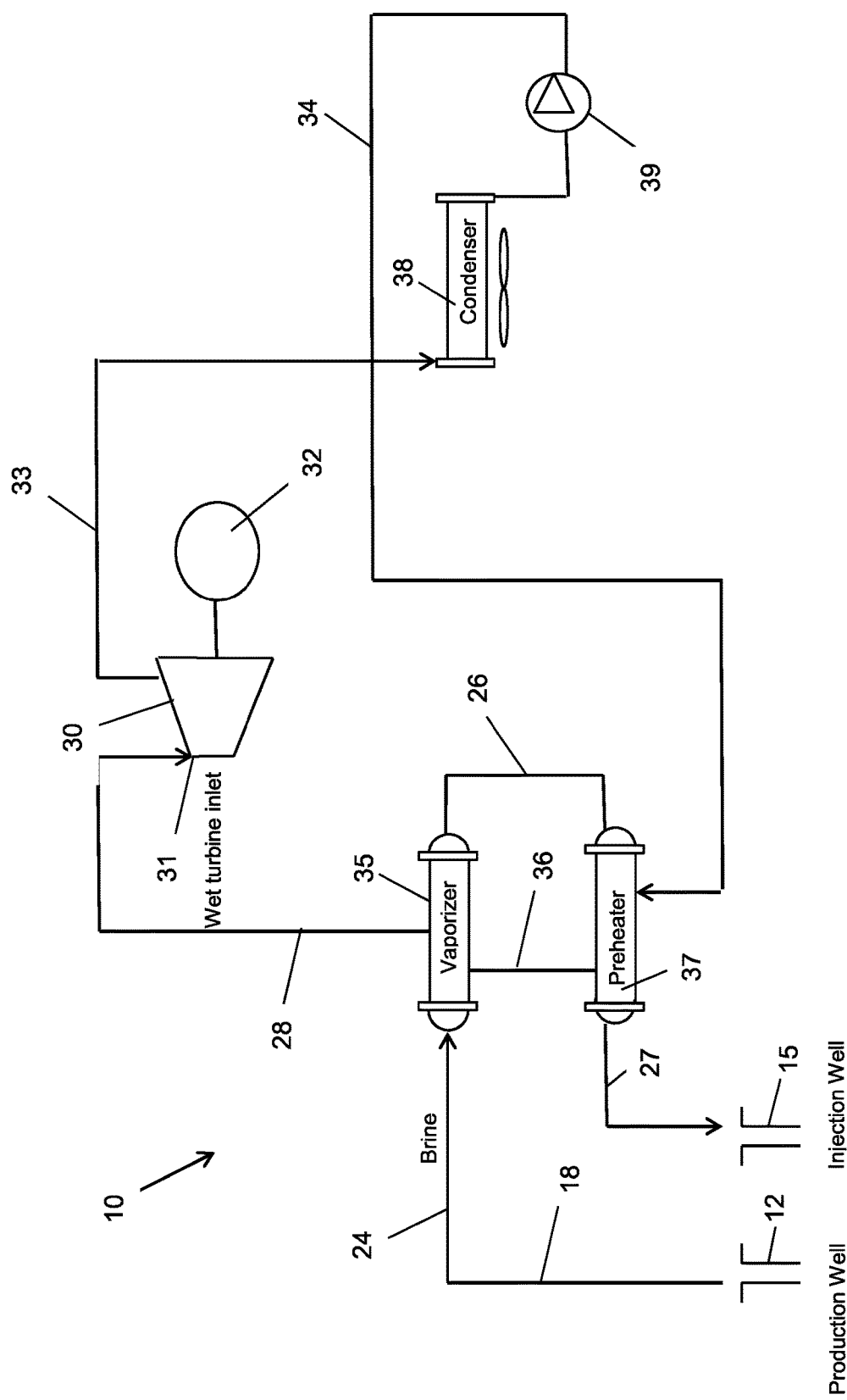
FIG. 1 is a schematic illustration of a power plant according to one embodiment.

Reference is first made to FIG. 1, which illustrates a binary power plant system according to one embodiment of the present invention, generally designated by reference numeral 10. The heat source of power plant system 10 is shown to be geothermal fluid delivered by production well 12 and rejected into injection well 15, although any other suitable heat source, including a low-temperature heat source such as a source of low temperature waste heat, is within the scope of the invention. Binary organic motive fluid circulating in a closed ORC extracts heat from the geothermal fluid to produce power in multi-stage organic vapor turbine 30, although the invention is also applicable to a single-stage organic vapor turbine. As mentioned and described herein, the motive fluid of the present invention is an organic motive fluid.

Power plant system 10 comprises organic vapor turbine 30, electric generator 32 coupled to organic vapor turbine 30, vaporizer 35, preheater 37, condenser 38, and organic motive fluid condensate pump 39. Organic vapor turbine 30 is generally of the axial type, although a radial turbine may be employed as well.

Geothermal fluid extracted from production well 12, usually in the form of geothermal liquid or brine, is delivered in line 18 and introduced to vaporizer 35 via tubes therein and is used to vaporize the organic motive fluid flowing through the shell side of the vaporizer at specific thermodynamic conditions that produce a liquid-vapor mixture having a quality of at least about 80%, for example 80-90%. The kettle portion of vaporizer 85 may be customized to obtain a desired quality.

It will be appreciated that the power plant system m ay be configured with a geothermal fluid separator so that geothermal fluid having vapor extracted from production well be separated into geothermal steam and geothermal liquid or brine exiting the separator in separate lines. In such a case, both the geothermal steam and brine can be introduced to the vaporizer via dedicated tubes.

The heat depleted geothermal fluid exiting vaporizer 35 via line 26 flows to preheater 37 in order to add sensible heat to the organic motive fluid condensate. The heat depleted geothermal fluid exiting preheater 37 via line 27 is delivered to injection well 15.

As power plant system 10 lacks a demister that often operates together with the vaporizer and adds further costs to the power plant, liquid droplets of organic motive fluid can be entrained into the vapor that is supplied to organic vapor turbine 30 via line 28 and turbine inlet 31. The turbine discharge exhausted from the final stage of turbine 30 flows via line 33 to condenser 38, which is shown to be air cooled but which may also be water cooled. Organic motive fluid condensate pump 39 delivers the organic motive fluid condensate to preheater 37 via line 34, and the preheated organic motive fluid flows via line 38 to vaporizer 35. A similar multi-stage organic motive fluid turbine is described in U.S. patent application Ser. No. 15/269,140, the disclosure of which is hereby incorporated by reference.

Supplying the organic vapor turbine with wet organic motive fluid vapor advantageously allows a greater amount of heat extracted from the heat source to be utilized in turbine 30 and thus produce more power thereby.

Figure 2:
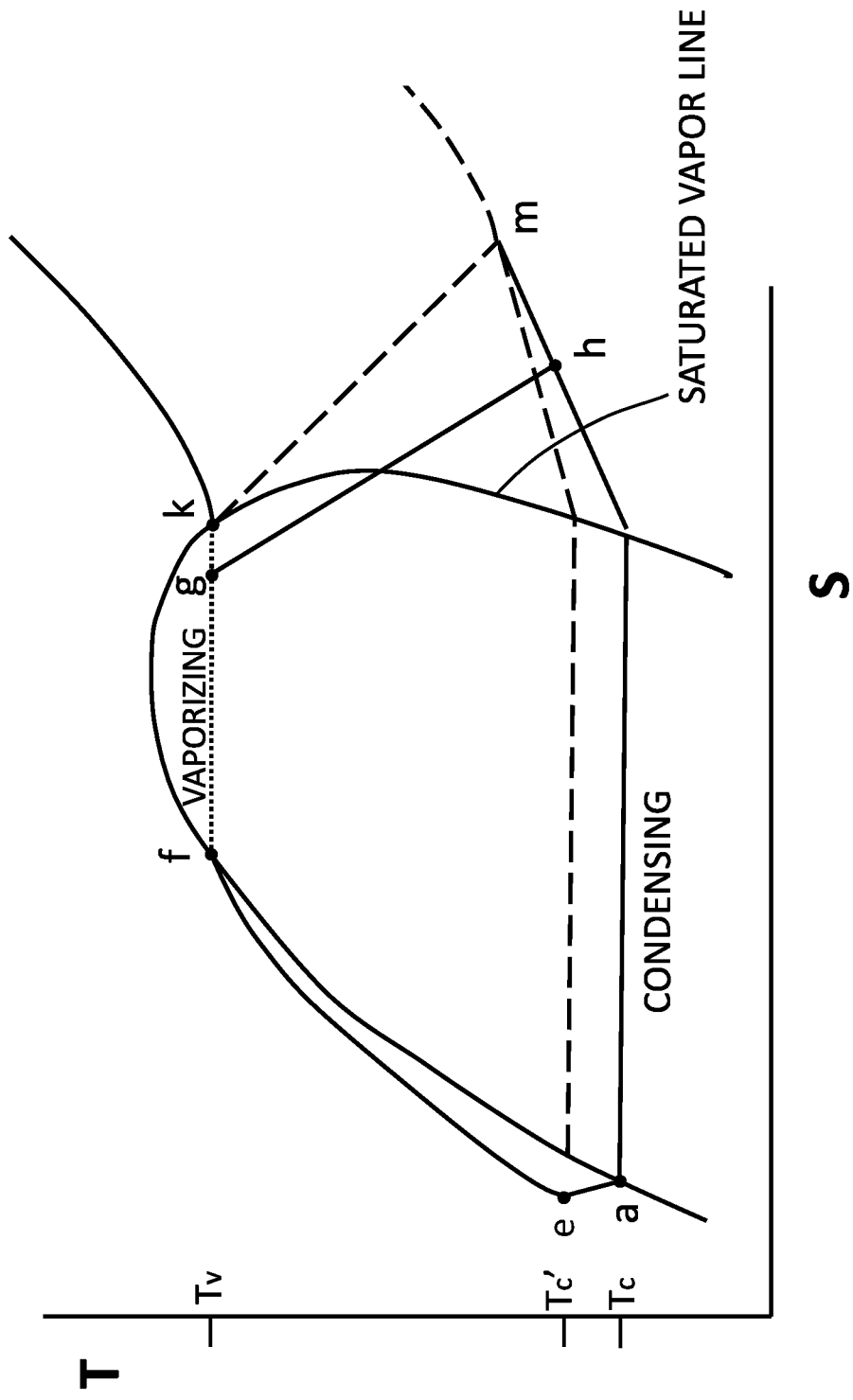
FIG. 2 is a temperature/entropy diagram for the power plant of FIG. 1 when configured with a single-stage turbine.

As shown in the T-S diagram of FIG. 2 which is representative of thermodynamic conditions of organic motive fluid circulating in a power plant of the present invention configured with a single-stage turbine, the organic motive fluid undergoing a phase change is heated isothermally within the vaporizer at vaporizing temperature $T_V$ from state f coinciding with the saturated liquid line to state g located within the liquid-vapor regime, after having been preheated from state e to state f. The wet organic motive fluid vapor is expanded within the turbine from state g to state h located within the superheated vapor regime as a result of the inclination of the saturated vapor line and is then condensed isothermally to state a at temperature $T_C$. From state a to state e, the pressure of the organic motive fluid condensate is increased by the organic motive fluid condensate pump.

The expansion of the wet organic motive fluid vapor from state g to state h is shown in contrast with the expansion of saturated vapor in a prior art power plant from state k on the saturated vapor line to state m at a higher level of superheat than state h. The expansion and subsequent condensation of saturated vapor in a prior art power plant are represented by dashed lines.

The improved thermal efficiency or improved utilization of heat from the heat source associated with the power plant of the invention is based on the understanding that the enthalpy difference between the beginning oi the preheating point at state e and the wet vapor point at state g, from which vapor is discharged from the vaporizer, is less than the enthalpy difference between the beginning of the preheating point and the vapor point on the saturated vapor line at state k.

More specifically, the thermal input Q to the cycle is given by the following relation, based on the second law of thermodynamics:

$$Q = m(h_g - h_e), \qquad \text{(Equation 1)}$$

where m is the mass flow rate and h is the specific enthalpy at a given state.

This relationship can also be expressed as follows:

$$m = Q(h_g - h_e). \qquad \text{(Equation 2)}$$

For a given heat source, the mass flow rate of organic motive fluid that can be circulated through the ORC, to allow for heat transfer from the heat source, when wet organic motive fluid vapor is discharged from the vaporizer to the turbine is advantageously higher than the mass flow rate when saturated organic motive fluid vapor is discharged from the vaporizer to the turbine simply because the enthalpy difference $(h_g - h_e)$ is less than the enthalpy difference $(h_k - h_e)$, as can be seen from Equation 2. Consequently, a higher power production level P is able to be achieved since the produced power level is a direct result of the mass flow rate, as given by the following relation:

$$P = m(h_g - h_h). \qquad \text{(Equation 3)}$$

Alternatively, a higher vaporization temperature $T_V$ can be produced from the given heat source when the mass flow rate of the circulated organic motive fluid is not increased, relative to prior art. The provision of a higher vaporization temperature also results in a higher Carnot efficiency B, as given by the following relation:

$$E = (T_V - T_C)/T_V. \qquad \text{(Equation 4)}$$

Figure 1A:
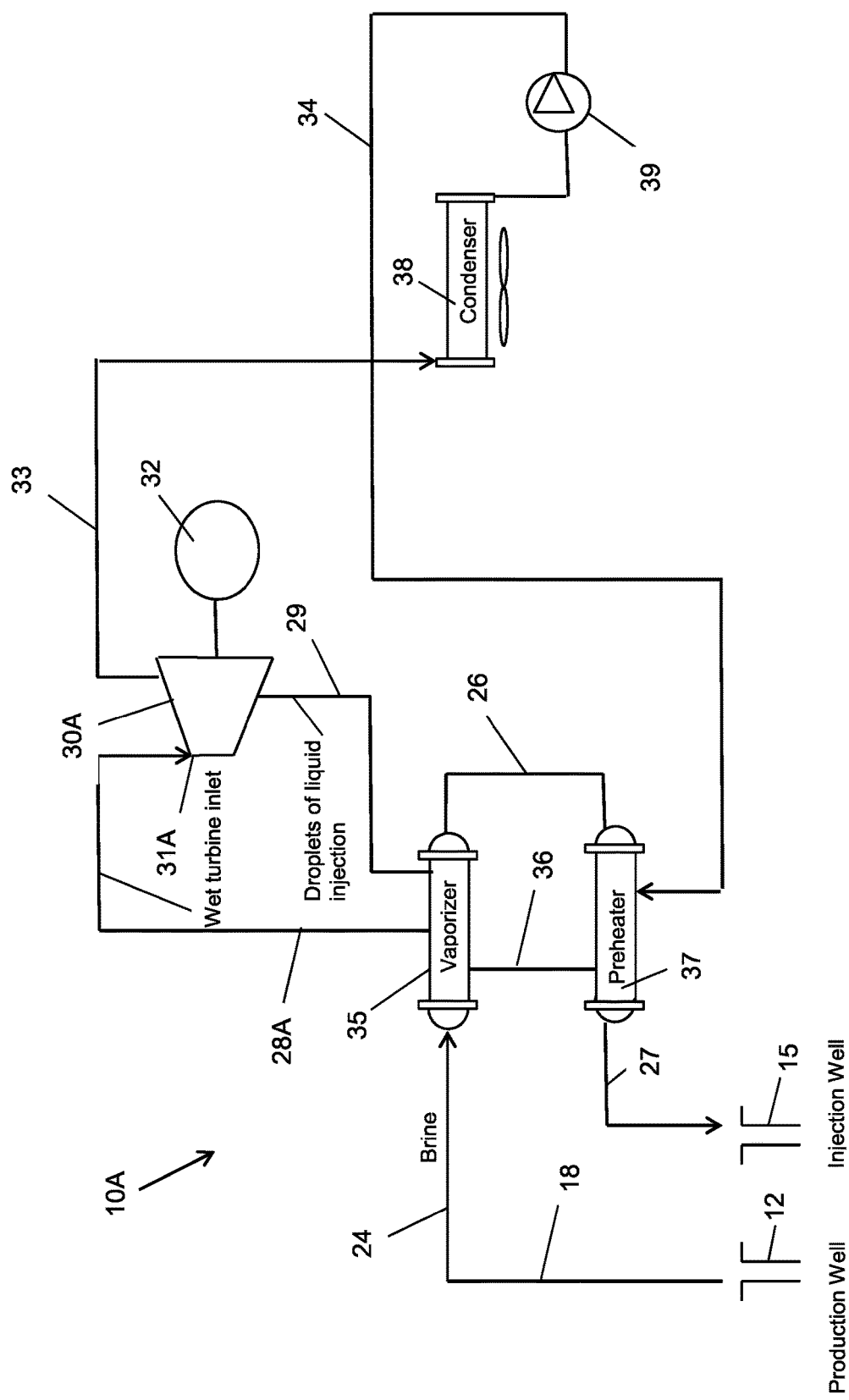
FIG. 1A is a schematic illustration of a power plant according to another embodiment.

In a further embodiment shown in FIG. 1A, when organic vapor turbine BOA is a multi-stage organic vapor turbine, wet organic motive fluid vapor is delivered via line 28A to inlet 31A of multi-stage organic vapor turbine BOA, and organic motive fluid, advantageously liquid, is delivered via line 29 to an intermediate stage of organic vapor turbine BOA. Alternatively, in accordance with this embodiment of the present invention, dry organic motive fluid can be supplied to multi-stage organic vapor turbine inlet 31.

Figure 3:
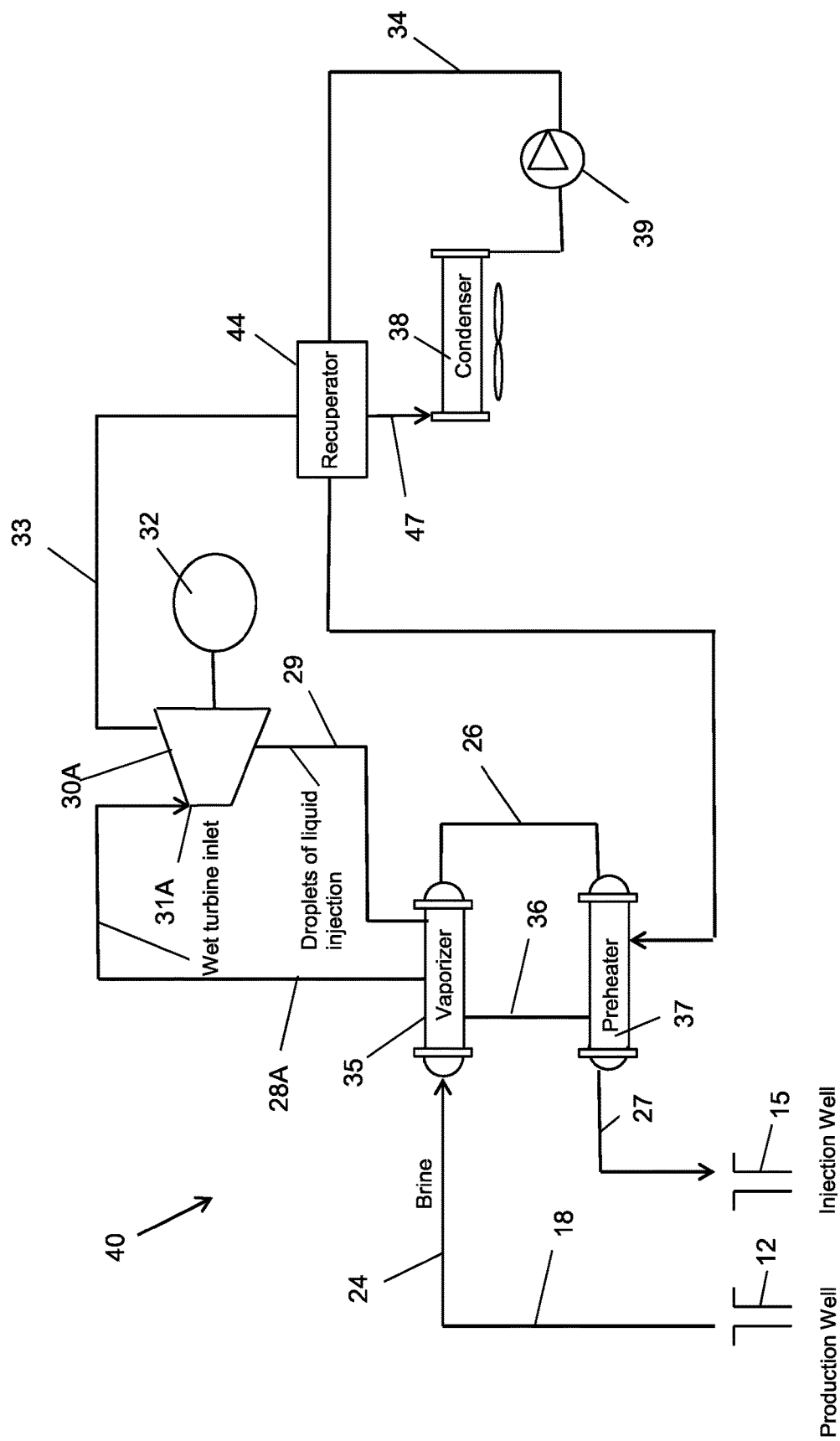
FIG. 3 is a schematic illustration of a power plant according to another embodiment.

A binary power plant system 40, illustrated in FIG. 3, similar to power plant 10 of FIG. 1A may also comprise a recuperator 44 to more efficiently utilize the turbine discharge, when its temperature is sufficiently high. Recuperator 44 receives the turbine discharge flowing through line 33 and thereby heats the condensate delivered by condensate pump 39 towards preheater 37. The heat depleted motive fluid exiting recuperator 44 flows to condenser 38 via line 47. In such a manner, the utilization of the heat extracted from the heat source by use of power plant 40 is more efficient.

When the single organic vapor turbine is a multi-stage organic vapor turbine, organic motive fluid, advantageously liquid, is also injected from the vaporizer to an intermediate stage of the turbine, such as a first intermediate stage, to enable better matching between the organic motive fluid and the heat source.

Figure 4:
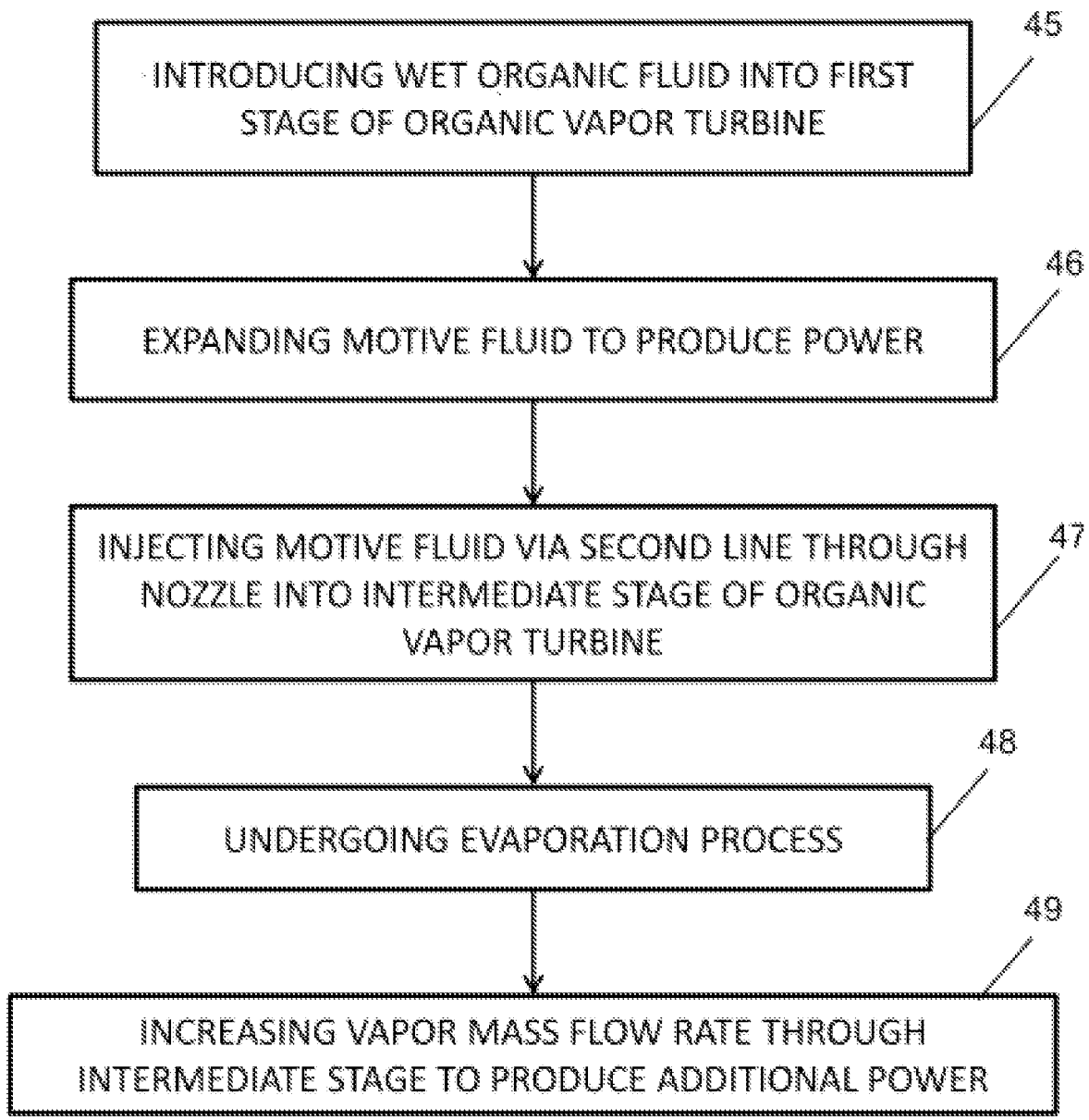
FIG. 4 is a flow chart of a method according to one embodiment.

Broadly speaking, as illustrated in FIG. 4, wet organic motive fluid vapor discharged from the vaporizer via a first line is introduced into a first stage of the organic vapor turbine in step 45. After the motive fluid is expanded within the turbine to a superheated state in step 40 to produce power, organic motive fluid discharged from the vaporizer via a second line is injected through a nozzle provided within the annular turbine housing into an intermediate stage of the organic vapor turbine in step 47, to induce a pressure drop in the injected motive fluid. Due to the pressure drop, an evaporation process takes place in step 48, whereby some of the liquid content of the injected motive fluid is converted to vapor, to increase the vapor mass flow rate of motive fluid through the intermediate stage of the organic vapor turbine in step 49, thereby producing additional power.

Figure 5:
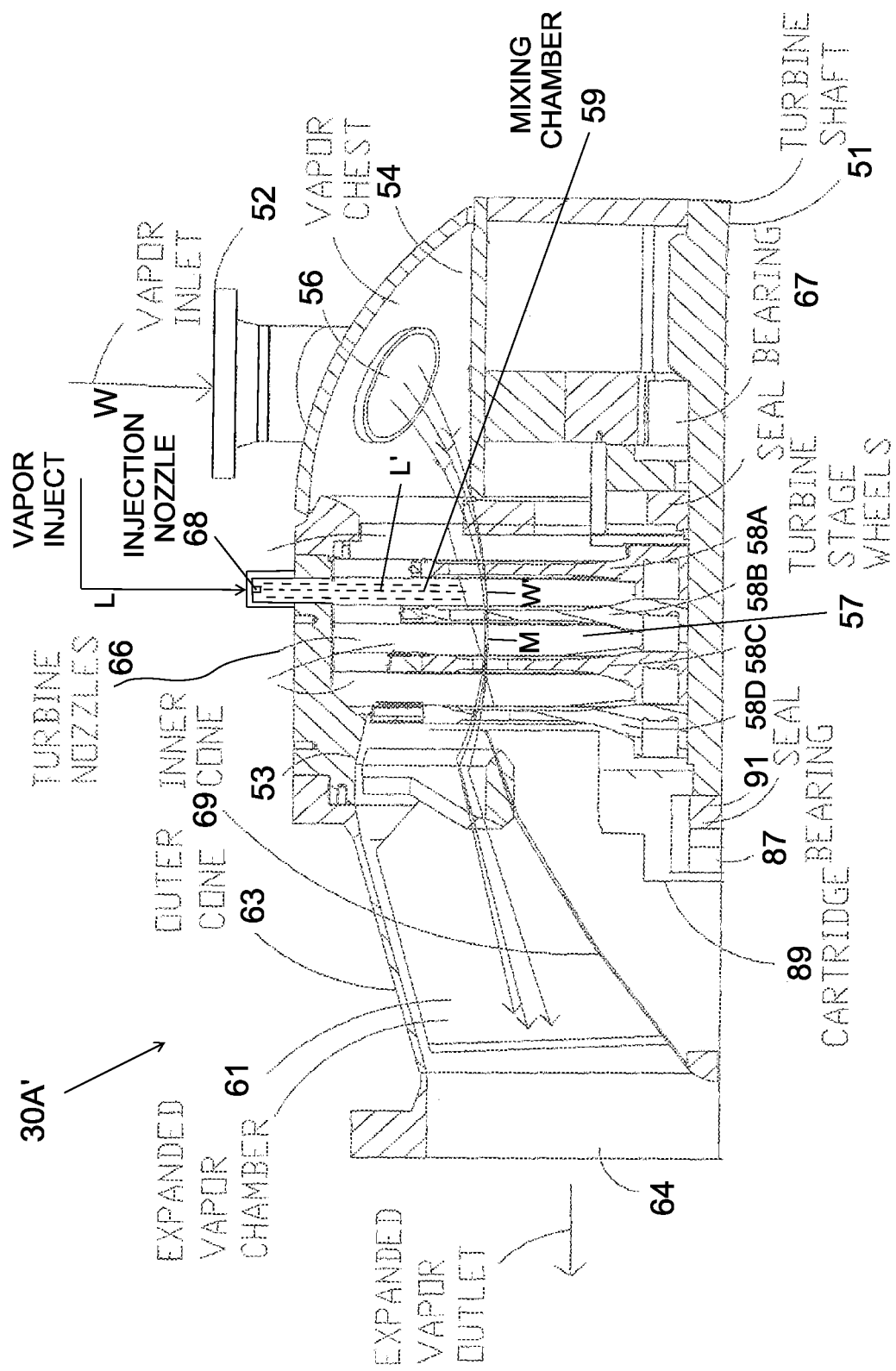
FIG. 5 is a cross sectional view of half a longitudinal section through a turbine according to one embodiment, showing an injection nozzle.

FIG. 5 illustrates one embodiment of a multi-stage organic Vapor axial turbine 30A' which is configured to facilitate injection of the wet organic motive fluid vapor into an intermediate stage thereof.

Turbine 30A' is of the axial inflow and outflow type. Wet motive fluid vapor W is introduced via inlet 52 into vapor chest and is axially discharged via vapor chest port 56 to turbine wheels 58A-D. The rotatable turbine wheels 58A-D, fixedly connected to turbine shaft 51, are provided in a chamber 57 defined by the radial space between turbine shaft 51 and annular turbine housing 53, which is axially adjacent to vapor chest 54. Turbine shaft 51 may be rotatably supported by two axially spaced bearings 67 and 87. Inlet-side bearing 67 is not exposed to the high temperature of the motive fluid, and therefore may be, advantageously, of conventional configuration. Outlet side bearing 87 located proximate to expanded vapor chamber 61, however, is liable to be exposed to the relatively high temperature of the expanded, motive fluid and would be subject to overheating if it were not protected. Outlet side bearing 87 is advantageously encased within a solid protective cartridge or bearing housing 89 in order to be isolated from the expanded motive fluid. Bearing housing 89 encompasses outlet-side bearing Bt. Beating housing 89 also provides sufficient cooling and lubrication of outlet-aide bearing 87, so as to prevent the latter from overheating if contacted or otherwise exposed to the hot expanded motive fluid. Advantageously, lubricating oil or thermal oil and motive fluid condensate can be used as cooling fluids for cooling outlet-side bearing 87 as well as the motive fluid condensate also providing cooling of seal 91. A seal 91 can be also positioned within bearing housing 89 to protect outlet-side bearing 87 from being impinged by hot unexpanded motive fluid, resulting for example from passage radially inwardly along the turbine wheels and axially along turbine shaft 51. Such a seal 91 is in sealing engagement with both the turbine shaft and the outlet-side bearing facing turbine shaft 51, to prevent ingress thereto of the hot motive fluid.

Each of the turbine wheels 58A-D constitutes one stage of turbine 30A. Although turbine 30A' is shown to provide four stages of expansion, it will be appreciated that turbine 30A[1] is similarly suitable to provide only two or three stages of expansion or alternatively more than four stages.

The rotating blades carried by a turbine wheel of a given stage interact with a corresponding set of fixed blades that are attached to annular turbine housing 53 and are arranged, as a ring, often referred to as a nozzle ring 66 since the fixed blades act as nozzles. The motive fluid is introduced to nozzle ring 66, which causes a partial decrease in pressure and a partial increase in velocity of the organic motive fluid and a rotation motion is imparted organic motive vapor. This vapor is directed onto the corresponding rotating blades of the given stage to bring about rotation of the turbine wheel of the respective expansion stage.

Such a process takes place at each, stage, so that the motive fluid is increasingly expanded by the blades carried by each of turbine wheels 58A-D, for example the illustrated vapor portion W which has been expanded by first stage turbine wheel 58A. The expanded vapor exiting the last stage turbine wheel, e.g. turbine wheel 58D, flows through expanded vapor chamber 61, located downstream, to the turbine wheels located between convergent outer cone 63 extending from annular turbine housing 53 and convergent inner cone 69, so that its exits turbine 30A' via outlet 64, which is axially spaced torn inlet 52. Inner convergent cone 69 within an inner region of expanded vapor chamber 61 may be provided, to help guide the expanded motive fluid towards outlet 64. The expanded vapor exiting outlet 64 is directed to the condenser of the power plant or to a heat exchange component in fluid communication therewith.

This axial inflow and outflow configuration facilitates axial expansion, so that the vapor-derived expansion forces applied to turbine shaft 51 are substantially evenly distributed. Turbine shaft 51, which is coupled to a generator for example by a coupling, is consequently caused to rotate by these vapor-derived expansion forces and to generate electricity.

An additional volume of organic motive fluid L discharged, advantageously, from the vaporizer, for example constituting about 15-30% of the total flow of motive fluid flowing from the preheater to the vaporizer, is injected into the second stage, or into any other intermediate stage, of turbine 30A via injection nozzle 68, which may outwardly protrude radially from outer annular turbine housing 53 as shown, or may be provided as any other suitable penetration therethrough. Turbine wheels 58A and 58B may be axially spaced by a dimension significantly greater than the axial spacing between the other turbine wheels to accommodate the discharge from injection nozzle 68 and to define a mixing chamber 59. Alternatively, if so desired, an external chamber can be provided for mixing the additional volume of organic motive fluid L discharged from the vaporizer with superheated vapor W within this external chamber designed to provide sufficient volume in order for the vapor so produced to reach an equilibrium state.

If so desired, motive fluid L may be injected simultaneously into more than one intermediate Stage of turbine 30A.

Injection nozzle 68 is configured to induce a pressure drop in the injected motive fluid L, after being exposed to the reduced pressure of expanded vapor W within chamber 59. The boiling point of motive fluid L is reduced due to the lower pressure, and therefore a portion L' of the injected motive fluid that is discharged from injection nozzle 68 vaporizes. In this fashion, the vapor mass flow rate of the motive fluid is advantageously increased downstream from the intermediate stage into which motive fluid L is injected.

The organic motive fluid L injected into the intermediate stage of turbine 30A may be in liquid form. Alternatively, if desired, the organic motive fluid may be injected as a vapor having the same quality as wet motive fluid vapor W introduced to inlet 52 after having been discharged in parallel from, the vaporizer. In a further alternative, motive fluid L may be of a reduced quality relative to wet motive fluid vapor W, so that the evaporation process will be particularly beneficial in generating a substantial amount of increased vapor.

The evaporated vapor L' mixes with superheated vapor W within interior chamber or mixing chamber 59 designed to provide sufficient volume in order for the vapor to reach an equilibrium state.

The flow conditions within turbine 30A' may be considered as variable phase flow conditions since the motive fluid, has a different phase, a different quality, or a different entropy in different regions within the turbine interior, or even within the same turbine chamber. In other words, the present invention provides a variable phase cycle (VPC). That is, motive fluid W exits vapor chest port 56 as a liquid-vapor mixture, expanded vapor W exits intermediate-stage turbine wheel 58A in a superheated state, evaporated vapor L' is discharged from injection nozzle 68 at a quality less than expanded vapor W', and mixed-flow M formed after expanded vapor W and evaporated vapor L' have been mixed together has a reduced entropy relative to expanded vapor W'.

The evaporation process leading to variable phase flow conditions in the present invention is differentiated from an enhanced flash organic power cycle, which is not part of the invention, whereby motive fluid liquid is pumped to a pressure higher than the turbine inlet pressure, so that heat is introduced by a heat exchanger when the motive fluid is in liquid phase, and subsequently the pressure of the motive fluid is reduced to the turbine inlet pressure by a flash evaporator, in order to generate the vapor to be expanded. The enhanced flash organic power cycle suffers from the drawbacks of high pump parasitic losses, a relatively low vaporization temperature, and an unused motive fluid liquid fraction which is delivered to the condenser after the vapor is generated so that exergy loss occurs or low expansion efficiency.

Furthermore, which an axial-type organic vapor turbine is described with reference to FIG. 5, the present invention can be carried using a radial turbine. In addition, two separate organic vapor turbine modules can be used in the present invention, where organic motive fluid is injected between the first and second organic vapor turbine modules.

Figure 6:
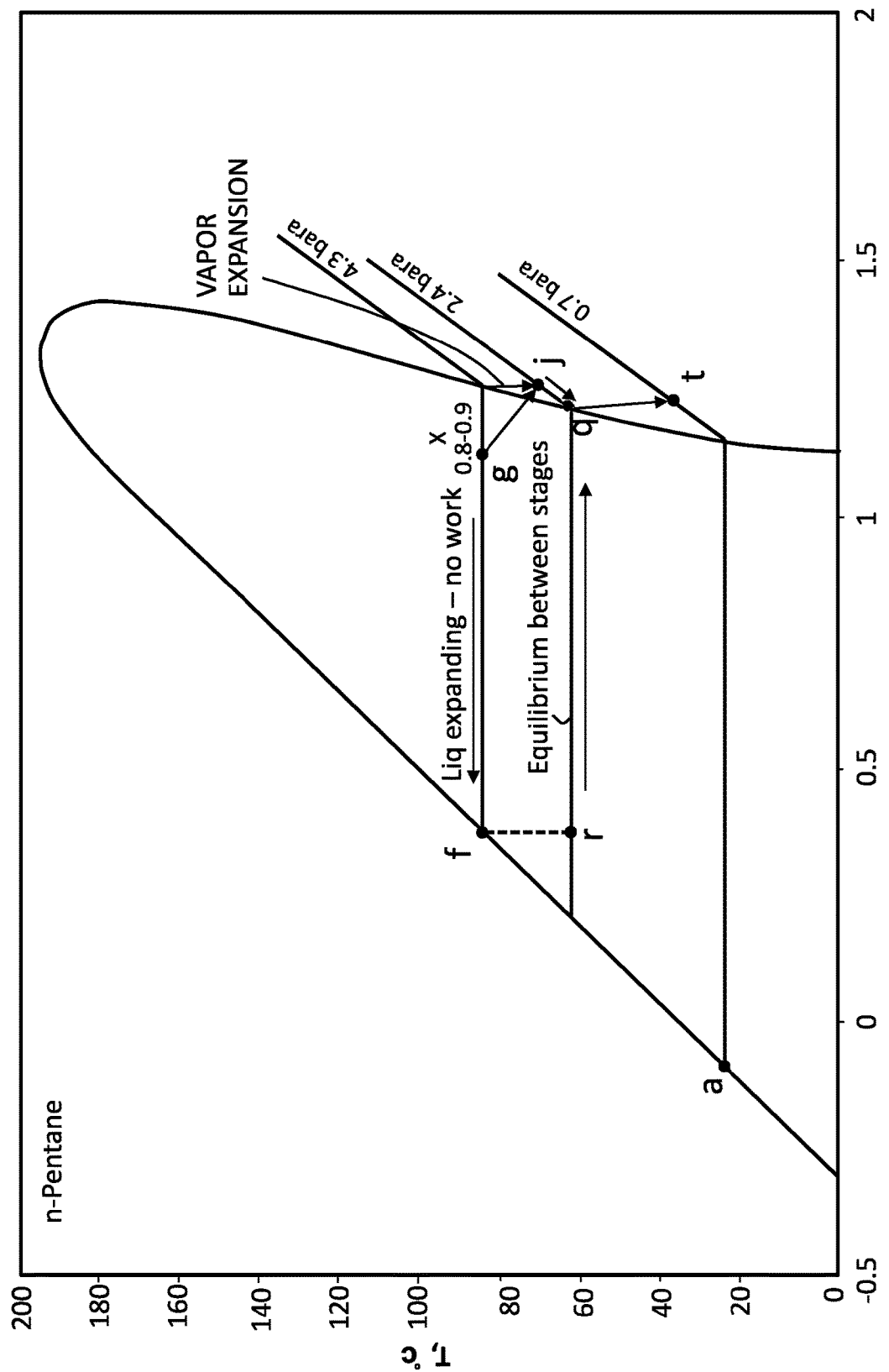
FIG. 6 is an example of a temperature/entropy diagram for the power plant of FIG. 1A when configured with a multi-stage organic vapor turbine.

As shown in the T-S diagram of FIG. 6, which shows an example of representative thermodynamic conditions of an exemplary n-pentane motive fluid, for example, circulating in an ORC power plant wherein a portion thereof is injected into an intermediate stage of a multi-stage organic vapor turbine and undergoes evaporation, the equilibrium state of the mixed-flow of organic motive fluid vapor formed by the mixing of the superheated expanded vapor and the evaporated vapor is close to the saturated vapor line of the organic motive fluid. By allowing the superheated expanded vapor and the evaporated vapor to become mixed and to achieve an equilibrium state, the evaporated vapor will attain the same temperature as the first-stage expanded vapor to facilitate a higher mass flow rate in an intermediate turbine stage and increased power output from the turbine during to the expansion of vapor produced in the intermediate expansion stage. Furthermore, the higher mass rate permits more efficient heat exchange matching.

As to the exemplary thermodynamic conditions, the organic motive fluid is isothermally heated by the vaporizer at a temperature of about 85° C. from state f at the saturated liquid line to state g when the quality is 80-90%. This vaporization temperature is higher than the temperature conventionally set for a vaporizer by virtue of the increased rate of heat extraction from the heat source to the wet organic motive fluid vapor. The wet motive fluid is introduced to the first stage of the organic vapor turbine when its pressure is slightly below 4.3 bars, and is expanded to state j, at a temperature of about 70° C. and a pressure of about 2.4 bars.

A portion of the organic motive fluid is delivered, from the vaporizer inlet, at state f to the injection nozzle penetrating the annular turbine housing, and undergoes evaporation, such that its temperature is reduced to a temperature of 60° C. at state r. The entropy of this portion of the organic motive fluid increases from 0.4 kJ/kg/K and within mixing chamber 59 (see FIG. 5), the injected organic motive fluid undergoes a phase change, and the entropy of the first-stage expanded superheated vapor decreases from 1.25 kJ/kg/K, until, the mixed flow achieves the equilibrium state q close to the saturated vapor line at a temperature of 60° C., an entropy of 1.20 kJ/kg/K and a pressure of about 2.4 bars. The mixed flow is then expanded in the intermediate stages to state t at a temperature of 38° C., an entropy of 1.23 kJ/kg/K and a pressure of 0.7 about bars. The motive fluid is then condensed to a temperature of 28° C. so that the liquid organic motive condensate reaches state a.

Since the mixed-flow of organic motive fluid vapor achieves an equilibrium state having an enthalpy less than the enthalpy of the first-stage expanded motive vapor, the total power output based on the first-stage expanded motive vapor and on the expanded motive vapor of the subsequent stages is greater than the power output if all of the motive fluid were expanded in a single-stage turbine. This increase in power output results from an enthalpy difference between the inlet and outlet of the multi-stage organic vapor turbine that is greater than the enthalpy difference between the inlet and outlet of the single-stage turbine.

In addition to the increased cycle efficiency and more effective utilization of heat from the heat source made possible by the higher vaporization temperature used, in accordance with the present invention (see FIG. 7), the thermal efficiency is also advantageously increased due to the increased, mass flow rate within the intermediate stages of the turbine. This is because the increased mass flow rate of the organic motive fluid discharged from the turbine is supplied to the preheater thus permitting, in the preheater, an increased rate of heat extraction from the heat source fluid to the organic motive fluid, compared to the prior art.

Figure 7:
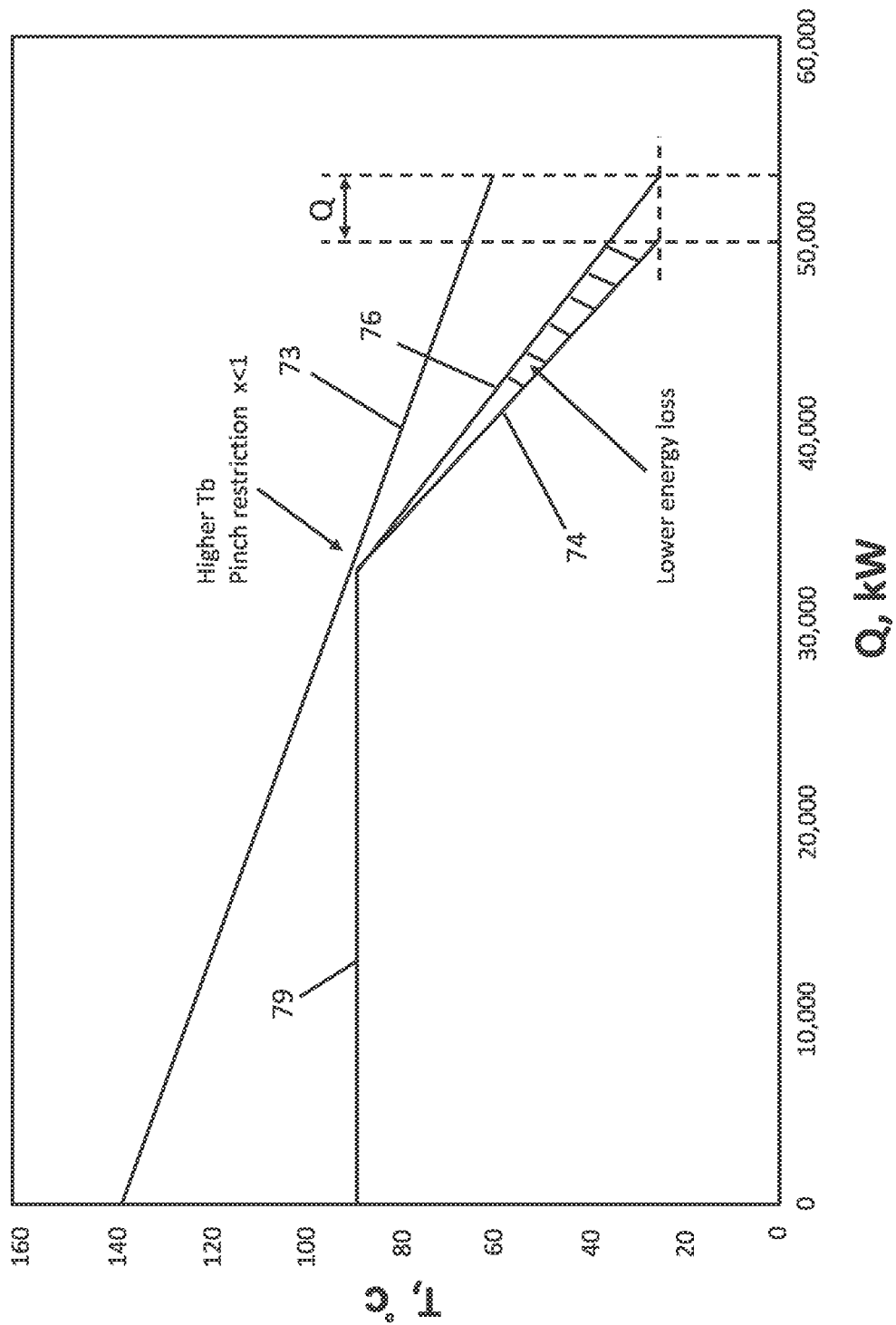
FIG. 7 is a temperature/heat diagram for the power plant, of FIG. 1 when configured with a multi-stage organic vapor turbine.

FIG. 7 illustrates a T-Q diagram that reflects the change in slope of the organic motive fluid heating line when its mass flow rate is increased.

Line 74 is the organic motive fluid heating line when a single-stage turbine is employed. Line 76 is the organic motive fluid heating line when a multi-stage organic vapor turbine is employed and additional organic motive fluid is injected into an intermediate stage, to increase the mass flow rate and power output through the intermediate stages. The mass flow rate of the organic motive fluid through the preheater is consequently increased relative to prior art values since all mixed-flow organic motive fluid discharged from the multi-stage organic vapor turbine takes part in the low temperature preheating portion of the power cycle. As shown, the slope of line 76 is closer to the heat source pooling line 73 than line 74, indicating that additional heat is extracted from the heat source and absorbed within the organic motive fluid flowing through the preheater with reduced heat loss. The additional amount of heat Q absorbed within the organic motive fluid flowing through the preheater as a result of the injected motive fluid is approximately 3000 kW heat.

At the same time, line 79 shows that the vaporization temperature of the organic motive fluid used, in accordance With the present invention, is increased to a temperature of about 85° C. This is because the vapor turbine is supplied with wet vapor produced by the vaporizer so that less heat is used during the vaporization process and furthermore since a reduced pinch point temperature difference requirement, or the temperature difference between the heat source fluid, and the organic fluid at the vaporization temperature, is used. Consequently, this leads to an increased Carnot efficiency for the variable phase cycle of the present invention in accordance with by Equation 4.

It is to be pointed out that while embodiments of the present invention are described with reference to FIG. 1 and FIG. 1A, in accordance with the present invention, a combination of both these embodiments can be also be used.

Table 1 indicates the increase in power output that is able to be achieved by subjecting a multi-stage organic vapor turbine to variable phase flow conditions particularly at relatively low temperatures of the geothermal source fluid. Conditions at the Tuscarora, Desert Peak and Don Campbell geothermal, power plants, all located in Nevada, USA, were examined. The Desert Peak power plant has a single ORC, while the Tuscarora and Don. Campbell power plants are based on an Integrated Two-Level Unit (ITLU) having two power units with a shared electric generator.

The design inlet temperature of the cooling medium of the condensers in these power plants is about 15° C., higher than the annual average ambient temperature in locations in close vicinity to the power plants. The annual average ambient temperature near the Tuscarora power plant is approximately 9° C., near the Desert Peak power plant is approximately 12° C., and near the Don Campbell power plant is approximately 13° C. In the Tuscarora power plant water-cooled condensers are used, while air-cooled condensers are used in the Don Campbell power plant. In the Desert Peak power plant, one condenser is water-cooled and one condenser is air-cooled.

TABLE 1

Power Calculation

| | Tuscarora | Desert Peak | Don Campbell |
|---|---|---|---|
| Configuration | ITLU | Single ORC | ITLU |
| Brine Conditions | 161.3 kg/s, 136.9° C. | 327.6 kg/s, 173.1° C. | 945 kg/s, 126.7° C. |
| Net Power (MW) | 24.4 | 5 | 23.2 |
| Quality | 0.8 | 0.8 | 0.8 |
| Power Increase | 4% (970 kW) | 4.2% (200 kW) | 3% (700 kW) |

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:
1. A binary power plant system, comprising:
 a) a vaporizer for vaporizing an organic motive fluid circulating in a closed Organic Rankine Cycle (ORC) by a heat source fluid in heat exchange relation therewith and producing wet organic motive fluid vapor having a quality greater than 80 percent and less than or equal to 90 percent; and b) a single organic vapor turbine of said ORC having an inlet for receiving said wet organic motive fluid vapor, wherein said wet organic motive fluid vapor is expanded in said single organic vapor turbine to a superheated state.

2. The binary power plant system according to claim 1, wherein the organic turbine is a multi-stage turbine and the vaporizer has two outlets, a first line extending from a first of said two outlets to the turbine inlet which is upstream to a first stage of the turbine and a second line extending from a second of said two outlets to an intermediate stage of the organic vapor turbine.

3. The binary power plant system according to claim 1, wherein the organic vapor turbine is a single-stage organic vapor turbine.

4. A binary power plant system comprising:
a) a vaporizer for vaporizing an organic motive fluid circulating in a closed Organic Rankine Cycle (ORC) by a heat source fluid in heat exchange relation therewith and producing wet organic motive fluid vapor having a quality of at least 80 percent;
b) a single multi-stage organic vapor turbine of said ORC having an inlet for receiving said wet organic motive fluid vapor, wherein said wet organic motive fluid vapor is expanded in said single organic vapor turbine; and
c) an injection nozzle fitted in a penetration formed in an outer annular housing of said turbine, wherein said vaporizer has two outlets, a first line extending from a first of said two outlets to said turbine inlet which is upstream to a first stage of said turbine and a second line extending from a second of said two outlets to an intermediate stage of said organic vapor turbine, wherein said injection nozzle is in fluid communication with the second line and with an interior chamber of said turbine which is directly upstream to the intermediate stage and is configured to cause the organic motive fluid flowing through the second line to undergo a vapor-producing evaporation process to produce additional organic motive vapor and to thereby increase a flow rate of the organic motive fluid flowing through the intermediate stage.

5. The binary power plant system according to claim 4, wherein the interior chamber is a mixing chamber in which the evaporated vapor is mixed with the expanded organic motive fluid vapor exiting said first stage of the organic vapor turbine to produce an organic motive fluid in an equilibrium state.

6. The binary power plant system according to claim 5, wherein the equilibrium state of organic motive fluid has a quality of no less than saturated vapor.

7. The binary power plant system according to claim 4, wherein the organic motive fluid flowing through the second line has a similar quality as the wet organic motive fluid vapor flowing through the first line.

8. The binary power plant system according to claim 4, wherein the organic motive fluid flowing through the second line has a lower quality than the quality of the wet organic motive fluid vapor flowing through the first line.

9. The binary power plant system according to claim 4, wherein the organic motive fluid flowing through the second line is saturated liquid.

10. The binary power plant system according to claim 9, wherein the evaporated vapor has a quality ranging from 50 to 60%.

11. The binary power plant system according to claim 4, wherein said multi-stage organic vapor turbine produces more power than if all the organic motive fluid were delivered from the vaporizer to a single-stage organic vapor turbine via a single line, at the same vaporization temperature, heat source fluid heat exchange, condenser related cooling medium and condensate pump conditions.

12. The binary power plant system according to claim 4, wherein said organic vapor turbine is an axial organic vapor turbine.

13. The binary power plant system according to claim 4, wherein the increased flow rate of the organic motive fluid is supplied to a preheater for preheating the organic motive fluid in liquid state prior to supplying it to said vaporizer.

14. The binary power plant system according to claim 1, wherein the heat source fluid is geothermal fluid.

15. The binary power plant system according to claim 14, wherein the heat source fluid is geothermal fluid having a temperature less than 140° C.

16. The binary power plant system according to claim 4, wherein the heat source fluid is geothermal liquid having a temperature less than 140° C. and means are provided for supplying said geothermal liquid to a preheater for preheating the increased flow rate of the organic motive fluid supplied to said preheater.

17. The binary power plant system according to claim 5 wherein the organic motive fluid vapor is expanded in the first stage to a superheated state.

18. The binary power plant system according to claim 1, wherein the wet organic motive fluid vapor is non-isothermally expanded in the single organic vapor turbine.

* * * * *